US008898372B2

(12) United States Patent
Yeh (10) Patent No.: US 8,898,372 B2
(45) Date of Patent: Nov. 25, 2014

(54) MEMORY STORAGE DEVICE, MEMORY CONTROLLER, AND DATA WRITING METHOD

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 339 days.

(21) Appl. No.: 13/111,959

(22) Filed: May 20, 2011

(65) Prior Publication Data

US 2012/0254511 A1    Oct. 4, 2012

(30) Foreign Application Priority Data

Mar. 29, 2011    (TW) .............................. 100110770 A (51) Int. Cl.
| | | |
|---|---|---|
| G06F 12/00 | (2006.01) |
| G06F 11/14 | (2006.01) |
| G06F 12/02 | (2006.01) |
| G06F 11/10 | (2006.01) |
| G06F 11/07 | (2006.01) |
| G06F 11/20 | (2006.01) |

(52) U.S. Cl.
CPC .......... *G06F 12/0246* (2013.01); *G06F 11/073* (2013.01); *G06F 11/2094* (2013.01); *G06F 2212/7201* (2013.01); *G06F 11/1435* (2013.01); *G06F 11/0766* (2013.01); *G06F 11/1048* (2013.01)
USPC ........................................................ 711/103

(58) Field of Classification Search
CPC ............ G06F 12/0246; G06F 11/0766; G06F 11/073; G06F 11/1435; G06F 11/2094; G06F 11/1048; G06F 2212/7201
USPC ........................................................ 711/103
See application file for complete search history.

(56) References Cited

U.S. PATENT DOCUMENTS

| | | | | |
|---|---|---|---|---|
| 8,065,497 | B2 * | 11/2011 | Chu et al. ....................... | 711/160 |
| 2010/0030979 | A1 | 2/2010 | Chu et al. | |
| 2010/0070735 | A1 * | 3/2010 | Chen et al. .................... | 711/206 |
| 2011/0239088 | A1 * | 9/2011 | Post .............................. | 714/763 |

FOREIGN PATENT DOCUMENTS

CN          101676882         3/2010

OTHER PUBLICATIONS

"Office Action of Taiwan Counterpart Application", issued on Feb. 20, 2014, p. 1-p. 14.
"Office Action of China Counterpart Application", issued on Jul. 28, 2014, p. 1-9.

* cited by examiner

*Primary Examiner* — Aimee Li
*Assistant Examiner* — Christopher Do
(74) *Attorney, Agent, or Firm* — Jianq Chyun IP Office (57) ABSTRACT

A memory storage device, a memory controller, and a data writing method are provided. The memory storage device has a rewritable non-volatile memory chip including a plurality of physical units, and each of the physical units has a plurality of physical pages. The data writing method includes configuring a plurality of logical units to be mapped to a portion of the physical units, and each of the logical unit has a plurality of logical pages. The data writing method also includes receiving a first write data from a host system and writing the first write data into the $i^{th}$ physical page in a substitute physical unit selected from the physical units. The data writing method further includes writing a first address access information corresponding to the first write data and a second address access information into the $i^{th}$ physical page. Herein i is a positive integer.

27 Claims, 10 Drawing Sheets

| | Data bit area | Redundant bit area | | |
|---|---|---|---|---|
| 0 | D1 | AI1 | S | ECC1 |
| 1 | D2 | AI2 | AI1 | ECC2 |
| 2 | D3 | AI3 | AI2 | ECC3 |
| 3 | | | | |
| ⋮ | | | | |
| M-1 | | 410(T) | | |

FIG. 5C

| | Data bit area | Redundant bit area | | |
|---|---|---|---|---|
| 0 | D1 | AI1 | S | ECC1 |
| 1 | D2 | AI2 | AI1 | ECC2 |
| 2 | D3 | AI3 | AI2 | ECC3 |
| 3 | | E | AI3 | |
| ⋮ | | | | |
| M-1 | | 410(T) | | |

MEMORY STORAGE DEVICE, MEMORY CONTROLLER, AND DATA WRITING METHOD

CROSS-REFERENCE TO RELATED APPLICATION

This application claims the priority benefit of Taiwan application serial no. 100110770, filed Mar. 29, 2011. The entirety of the above-mentioned patent application is hereby incorporated by reference herein and made a part of this specification.

BACKGROUND

1. Technology Field

The invention generally relates to a data writing method, and more particularly, to a method for backing up data when the data is written, and a memory storage device and a memory controller using the same.

2. Description of Related Art

Rewritable non-volatile memory is broadly applied in various electronic devices due to its characteristics such as data non-volatility, low power consumption, small volume, and non-mechanical structure. Solid state drive (SSD) is a storage device which uses rewritable non-volatile memory as its storage medium and is becoming more and more focused by consumers because of its many advantages.

A rewritable non-volatile memory has a plurality of physical blocks, and each of the physical blocks has a plurality of physical pages. Physical block is the smallest unit for erasing data, while physical page is the smallest unit for writing data. A memory management circuit of a storage device converts a logical access address to be accessed by a host system into a corresponding logical page and accesses a physical page corresponding to the logical page.

Error bits may be produced in data stored in a rewritable non-volatile memory due to various factors (for example, electric leakage of memory cells, program failure, and so on). Thus, an error checking and correcting (ECC) circuit is usually disposed in a storage device to ensure the accuracy of data. When a host system is about to read data from a SSD, because the data may be a crucial boot file or system file, the data cannot be directly sent back to the host system if the number of error bits in the data exceeds the number of error bits that can be corrected by the ECC circuit. Instead, the host system is notified about the data error so that the operating system in the host system will to correct the error.

Generally speaking, when data is read according to a read command received from the host system, a logical access address corresponding to the data can be identified according to the read command, and accordingly, the host system can be correctly responded when a data error is detected. However, if a data error is detected when a SSD is restarted and the physical pages are scanned, the logical access address corresponding to the data in a physical page cannot be determined based on the information recorded in the physical page. Thus, if subsequently the host system is about to read the logical access address and the host system is not correctly notified about the data error, problems may be caused in the operation of the operating system of the host system.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data writing method, a memory controller, and a memory storage device, wherein data is backed up at the same time when it is written so that incorrect data is prevented from being sent back to a host system.

The invention provides a data writing method adapted to a memory storage device having a rewritable non-volatile memory chip. The rewritable non-volatile memory chip includes a plurality of physical units, and each of the physical units includes a plurality of physical pages. The data writing method includes configuring a plurality of logical units to be mapped to a portion of the physical units, wherein each of the logical units includes a plurality of logical pages. The data writing method also includes receiving a first write data from a host system and writing the first write data into the $i^{th}$ physical page in a substitute physical unit selected from the physical units. The data writing method further includes writing a first address access information corresponding to the first write data and a second address access information into the $i^{th}$ physical page. Herein i is a positive integer.

The invention also provides a memory controller for managing a rewritable non-volatile memory chip in a memory storage device. The memory controller includes a host system interface, a memory interface, and a memory management circuit. The host system interface is configured to couple a host system. The memory interface is configured to couple the rewritable non-volatile memory chip. The rewritable non-volatile memory chip includes a plurality of physical units, and each of the physical units includes a plurality of physical pages. The memory management circuit is coupled to the host system interface and the memory interface. The memory management circuit configures a plurality of logical units to be mapped to a portion of the physical units, wherein each of the logical units includes a plurality of logical pages. The memory management circuit further receives a first write data from the host system through the host system interface, writes the first write data into the $i^{th}$ physical page in a substitute physical unit selected from the physical units, and writes a first address access information corresponding to the first write data and a second address access information into the $i^{th}$ physical page, wherein i is a positive integer.

The invention further provides a memory storage device including a rewritable non-volatile memory chip, a connector, and a memory controller. The rewritable non-volatile memory chip includes a plurality of physical units, and each of the physical units includes a plurality of physical pages. The connector is configured to couple a host system. The memory controller is coupled to the rewritable non-volatile memory chip and the connector. The memory controller configures a plurality of logical units to be mapped to a portion of the physical units, wherein each of the logical units includes a plurality of logical pages. The memory controller further receives a first write data from the host system through the connector, writes the first write data into the $i^{th}$ physical page in a substitute physical unit selected from the physical units, and writes a first address access information corresponding to the first write data and a second address access information into the $i^{th}$ physical page, wherein i is a positive integer.

As described above, in the invention, when data is written into a rewritable non-volatile memory chip, the data, address access information corresponding to the data, and address access information corresponding to another data are recorded into a physical page, so that the address access information for writing the data can be backed up. Accordingly, if any data error is detected when a memory storage device is started and the physical pages are scanned, the logical page corresponding to the data in the physical page containing the data error can be identified by using the backup of the address access information. Thus, when subsequently a host system reads this logical page, the incorrect data will not be sent back to the host system.

These and other exemplary embodiments, features, aspects, and advantages of the invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a memory chip and a controller (also referred to as a control circuit). A memory storage device is usually used along with a host system so that the host system can write data into or read data from the memory storage device. In addition, a memory storage device may also include an embedded memory and a software that can be executed in a host system and substantially served as a controller of the embedded memory.

Figure 1A:
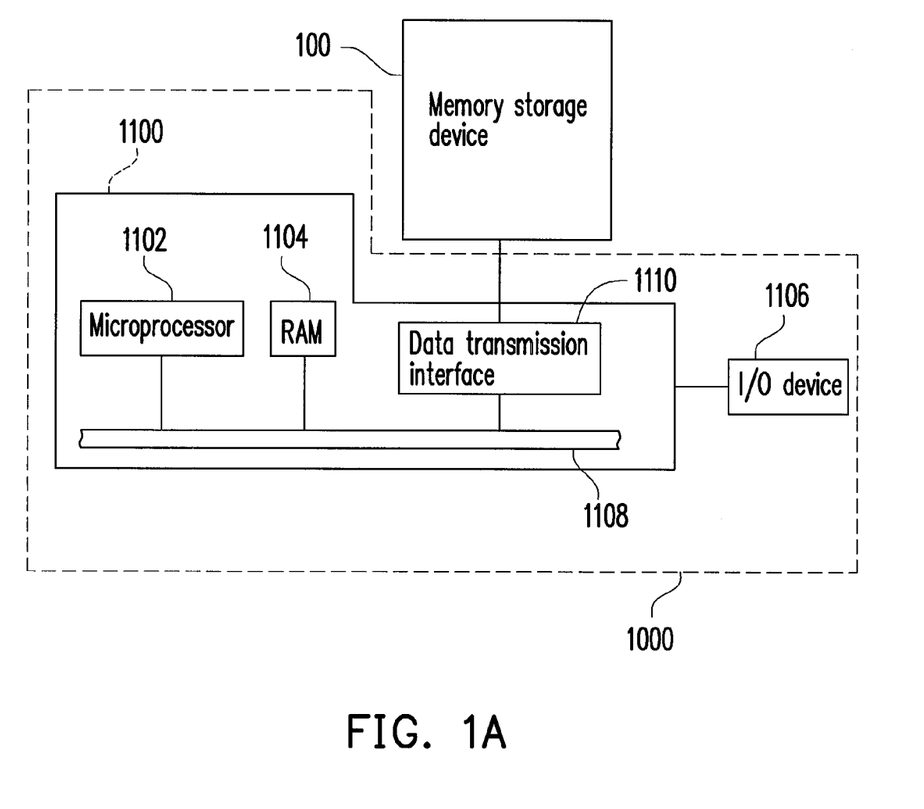
FIG. 1A is a diagram of a host system and a memory storage device according to an exemplary embodiment of the invention.

FIG. 1A illustrates a host system and a memory storage device according to an exemplary embodiment of the invention.

Figure 1B:
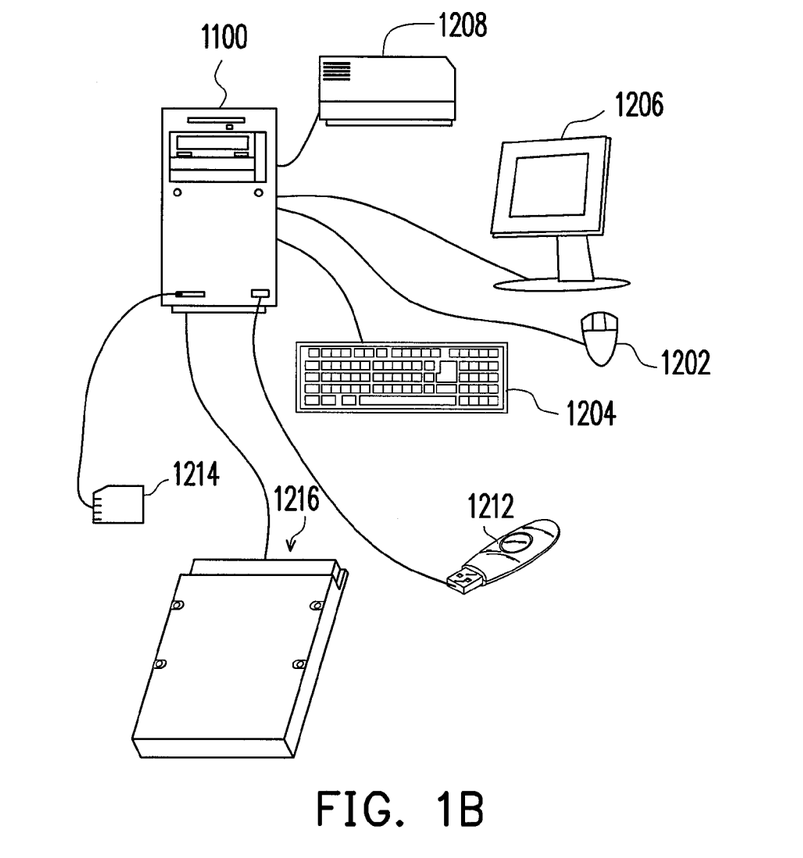
FIG. 1B is a diagram of a computer, an input/output (I/O) device, and a memory storage device according to an exemplary embodiment of the invention.

The host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B and may further include other devices.

In the present exemplary embodiment, the memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 may be a flash drive 1212, a memory card 1214, or a solid state drive (SSD) 1216, as shown in FIG. 1B.

Figure 1C:
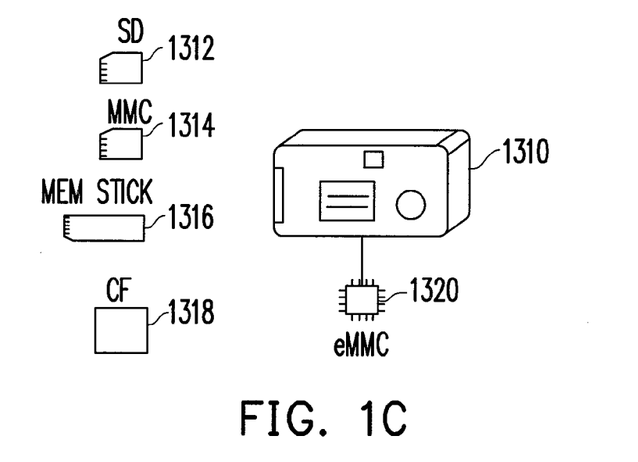
FIG. 1C is a diagram of a host system and a memory storage device according to another exemplary embodiment of the invention.

Generally speaking, the host system 1000 can be substantially any system that can store data. Even tough the host system 1000 is described as a computer system in the present exemplary embodiment, in another exemplary embodiment of the invention, the host system 1000 may also be a cell phone, a digital camera, a video camera, a communication device, an audio player, or a video player. For example, if the host system is a digital camera 1310, the memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera 1310. The embedded storage device 1320 includes an embedded MMC (eMMC). It should be mentioned that the eMMC is directly coupled to the motherboard of a host system.

Figure 2:
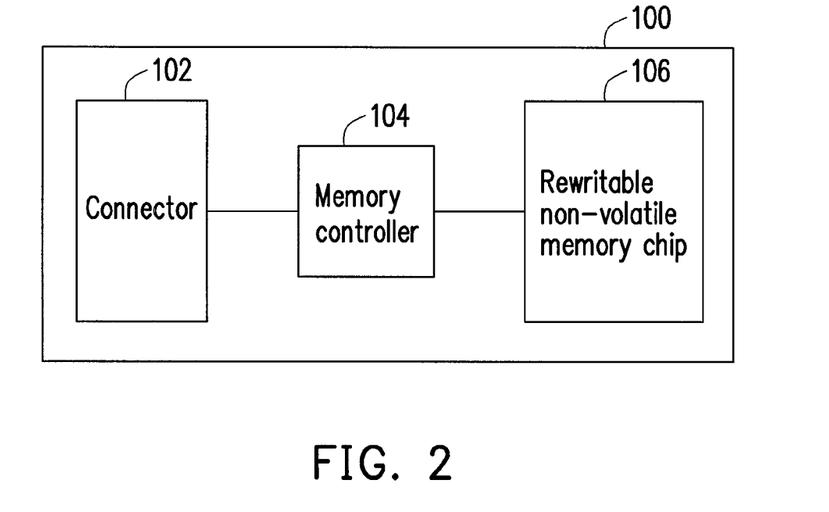
FIG. 2 is a schematic block diagram of the memory storage device in FIG. 1A.

FIG. 2 is a schematic block diagram of the memory storage device 100 in FIG. 1A. Referring to FIG. 2, the memory storage device 100 includes a connector 102, a memory controller 104, and a rewritable non-volatile memory chip 106.

The connector 102 is coupled to the memory controller 104 and configured to couple the host system 1000. In the present exemplary embodiment, the connector 102 may be complied with a serial advanced technology attachment (SATA) interface. However, the invention is not limited thereto, and in other exemplary embodiments, the connector 102 may also be complied with a universal serial bus (USB) interface, a MMC interface, a parallel advanced technology attachment (PATA) interface, an Institute of Electrical and Electronic Engineers (IEEE) 1394 interface, a peripheral component interconnect (PCI) express interface, a SD interface, a MS interface, a CF interface, an integrated drive electronics (IDE) interface, or any other suitable interface.

The memory controller 104 executes a plurality of logic gates or control instructions implemented in a hardware form or a firmware form and performs various data operations on the rewritable non-volatile memory chip 106 according to commands received from the host system 1000. In particular, the memory controller 104 further backs up some information in other physical pages while writing data through the data writing method in the present exemplary embodiment. The data writing method in the present exemplary embodiment will be described later with reference to accompanying drawings.

The rewritable non-volatile memory chip 106 is coupled to the memory controller 104. The rewritable non-volatile memory chip 106 stores file system information (for example, a file allocation table (FAT) or a new technology file system (NTFS)) and general data (for example, text, video, and audio files). The rewritable non-volatile memory chip 106 may be a multi level cell (MLC) NAND flash memory chip. However, the invention is not limited thereto, and the rewritable non-volatile memory chip 106 may also be a single level cell (SLC) NAND flash memory chip, any other flash memory chip, or any other memory chip having the same characteristics.

Figure 3:
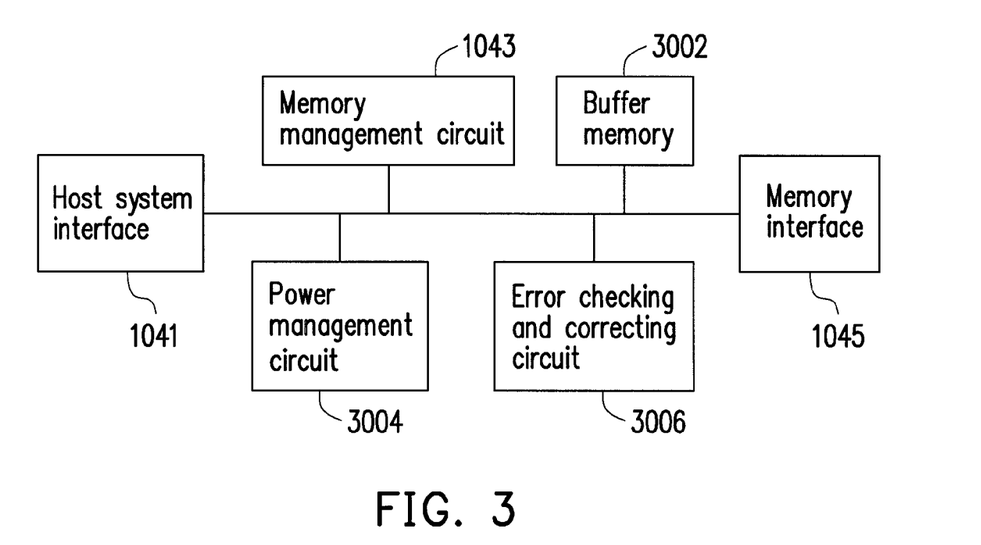
FIG. 3 is a schematic block diagram of a memory controller according to an exemplary embodiment of the invention.

FIG. 3 is a schematic block diagram of a memory controller according to an exemplary embodiment of the invention. Referring to FIG. 3, the memory controller 104 includes a host system interface 1041, a memory management circuit 1043, and a memory interface 1045.

The host system interface 1041 is coupled to the memory management circuit 1043 and configured to couple the host system 1000 through the connector 102. The host system interface 1041 receives and identifies commands and data from the host system 1000. Accordingly, commands and data transmitted by the host system 1000 are sent to the memory management circuit 1043 through the host system interface 1041. In the present exemplary embodiment, the host system interface 102 is, corresponding to the connector 102, a SATA interface. However, in other exemplary embodiments, the host system interface 1041 may also be a USB interface, a MMC interface, a PATA interface, an IEEE 1394 interface, a PCI express interface, a SD interface, a MS interface, a CF interface, an IDE interface, or an interface conforming to any other interface standard.

The memory management circuit 1043 controls the overall operation of the memory controller 104. To be specific, the memory management circuit 1043 has a plurality of control instructions, and when the memory storage device 100 is in operation, the control instructions are executed to accomplish the data writing method in the present exemplary embodiment.

In an exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to accomplish the data writing method in the present exemplary embodiment.

In another exemplary embodiment of the invention, the control instructions of the memory management circuit 1043 may also be stored in a specific area of the rewritable non-volatile memory chip 106 (for example, a system area exclusively used for storing system data in the rewritable non-volatile memory chip 106) as program codes. In addition, the memory management circuit 1043 has a microprocessor unit (not shown), a ROM (not shown), and a RAM (not shown). In particular, the ROM has a driving code segment. When the memory controller 104 is enabled, the microprocessor unit first executes the driving code segment to load the control instructions from the rewritable non-volatile memory chip 106 into the RAM of the memory management circuit 1043. Thereafter, the microprocessor unit runs the control instructions to execute the data writing method in the present exemplary embodiment. Moreover, in yet another exemplary embodiment of the invention, the control instructions of the memory management circuit 1043 may also be implemented in a hardware form.

The memory interface 1045 is coupled to the memory management circuit 1043, so as to couple the memory controller 104 with the rewritable non-volatile memory chip 106. Accordingly, the memory controller 104 can perform various operations on the rewritable non-volatile memory chip 106. Namely, data to be written into the rewritable non-volatile memory chip 106 is converted by the memory interface 1045 into a format acceptable to the rewritable non-volatile memory chip 106.

In an exemplary embodiment of the invention, the memory controller 104 further includes a buffer memory 3002. The buffer memory 3002 may be a static random access memory (SRAM) or a dynamic random access memory (DRAM). However, the invention is not limited thereto. The buffer memory 3002 is coupled to the memory management circuit 1043 and used for temporarily storing data from the host system 1000 or the rewritable non-volatile memory chip 106.

In another exemplary embodiment of the invention, the memory controller 104 further includes a power management circuit 3004. The power management circuit 3004 is coupled to the memory management circuit 1043 and configured to control the power supply of the memory storage device 100.

In yet another exemplary embodiment of the invention, the memory controller 104 further includes an error checking and correcting (ECC) circuit 3006. The ECC circuit 3006 is coupled to the memory management circuit 1043 and configured to execute an ECC procedure to ensure data accuracy. To be specific, when the memory management circuit 1043 receives a write command from the host system 1000, the ECC circuit 3006 generates a corresponding ECC code for the data corresponding to the write command, and the memory management circuit 1043 writes the data corresponding to the write command and the corresponding ECC code into the rewritable non-volatile memory chip 106. Subsequently, when the memory management circuit 1043 reads data from the rewritable non-volatile memory chip 106, it also reads the ECC code corresponding to the data, and the ECC circuit 3006 executes the ECC procedure on the data according to the ECC code.

Figure 4A:
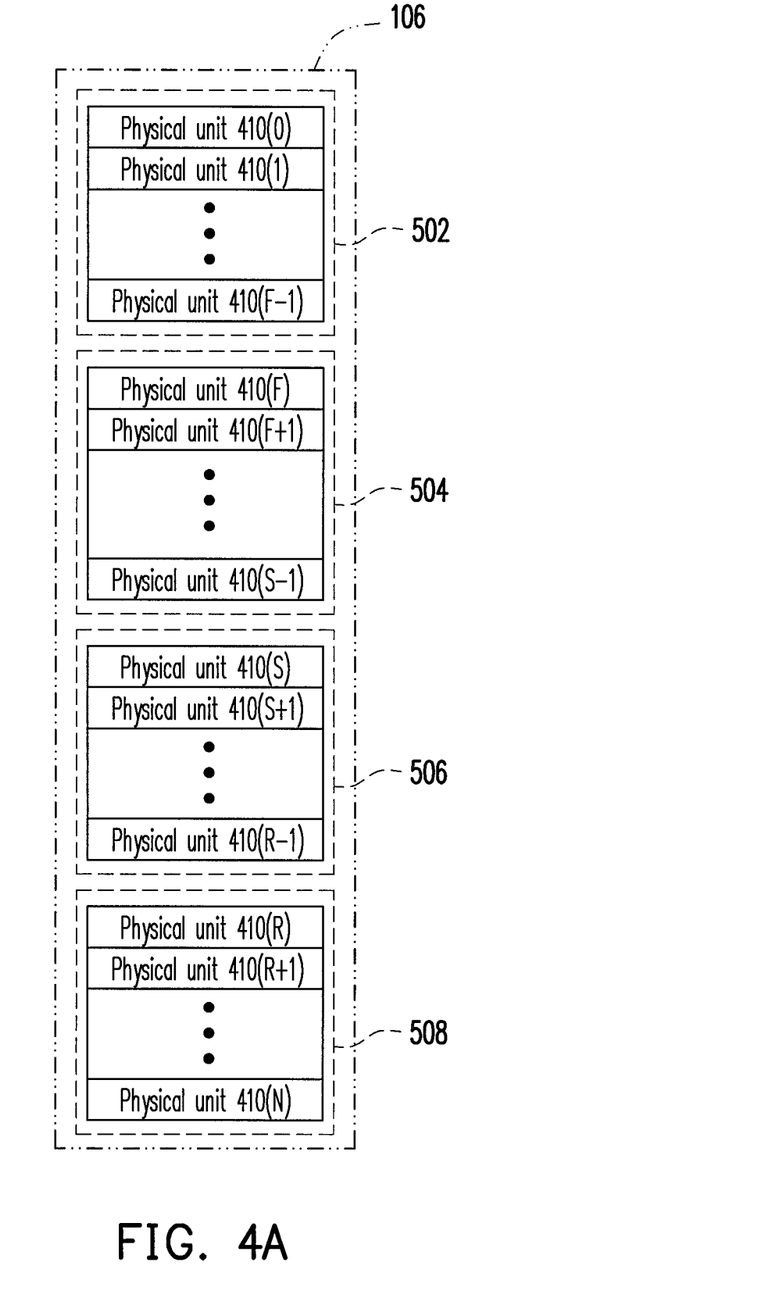
FIG. 4A and FIG. 4B are diagrams illustrating how physical units are managed according to an exemplary embodiment of the invention.
Figure 4B:
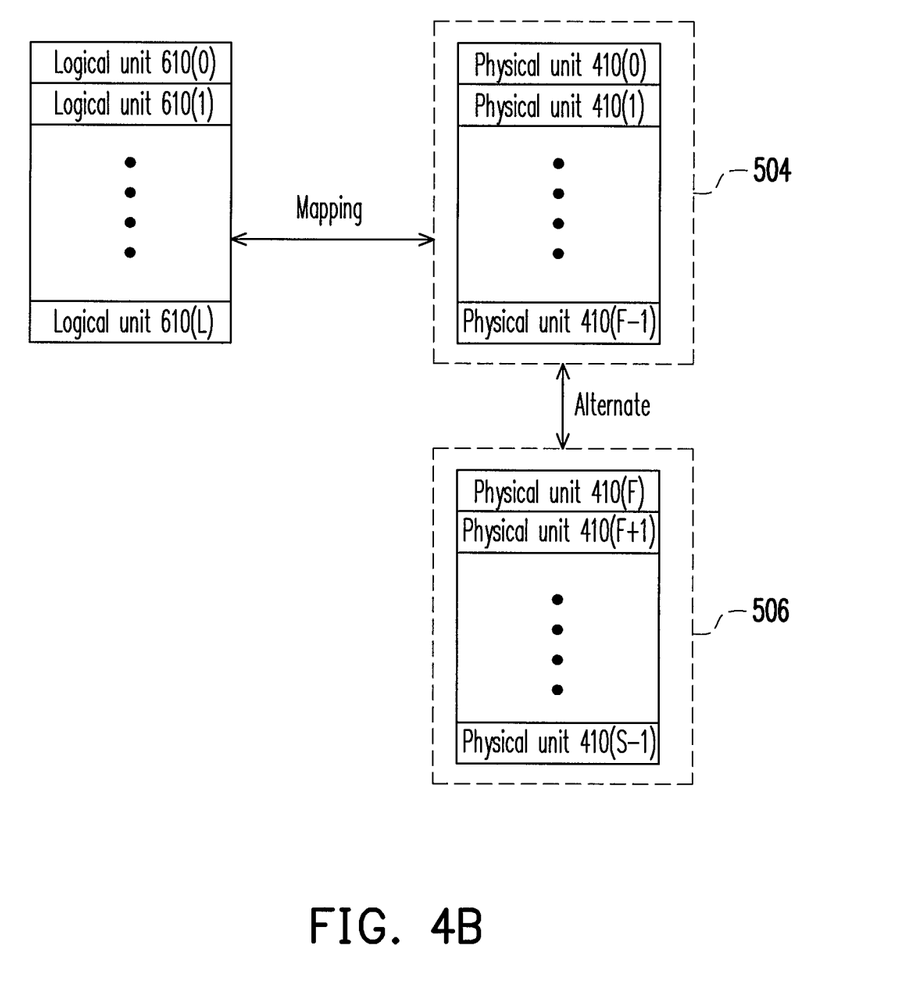

FIG. 4A and FIG. 4B are diagrams illustrating how physical units are managed according to an exemplary embodiment of the invention.

Referring to FIG. 4A, the rewritable non-volatile memory chip 106 in the present exemplary embodiment includes physical units 410(0)-410(N), wherein each of the physical units includes a plurality of physical pages. In the present exemplary embodiment, each physical unit is composed of one physical block. However, the invention is not limited thereto, and in another exemplary embodiment of the invention, each physical unit may also be composed of multiple physical blocks.

The memory management circuit 1043 in the memory controller 104 logically groups the physical units 410(0)-410(N) into a data area 502, a spare area 504, a system area 506, and a replacement area 508. The symbols F, S, R, and N in FIG. 4A are positive integers and respectively represent the numbers of physical units in foregoing areas, and these numbers can be determined by the manufacturer of the memory storage device 100 according to the capacity of the rewritable non-volatile memory chip 106.

Physical units logically belonging to the data area 502 and the spare area 504 are used for storing data from the host system 1000. To be specific, physical units in the data area 502 are considered physical units containing data, while physical units in the spare area 504 are used for substituting the physical units in the data area 502. In other words, the physical units in the spare area 504 are blank or usable physical units (no data is recorded therein or data recorded therein is marked as invalid data). When a write command and data to be written are received from the host system 1000, the memory management circuit 1043 selects a physical unit from the spare area 504 and writes the data into the selected physical unit, so as to substitute the physical unit in the data area 502.

Physical units logically belonging to the system area 506 are used for recording system data, such as the manufacturer and model of the rewritable non-volatile memory chip 106.

Physical units logically belonging to the replacement area 508 are used for replacing damaged physical units in the data area 502, the spare area 504, or the system area 506. To be specific, if there are still normal physical units in the replacement area 508 and a physical unit in the data area 502 is damaged, the memory management circuit 1043 selects a normal physical unit from the replacement area 508 to replace the damaged physical unit in the data area 502.

In order to allow the host system 1000 to access the rewritable non-volatile memory chip 106, referring to FIG. 4B, the memory management circuit 1043 configures a plurality of logical units 610(0)-610(L) to be mapped to the physical units 410(0)-410(F−1) in the data area 502. Each of the logical units includes a plurality of logical pages, and the logical pages in the logical units 610(0)-610(L) are sequentially mapped to the physical pages in the physical units 410(0)-410(F−1).

The memory management circuit 1043 provides the logical units 610(0)-610(L) to the host system 1000 and maintains a logical unit-physical unit mapping table to record the mapping relationship between the logical units 610(0)-610(L) and the physical units 410(0)-410(F−1). Thus, when the host system 1000 is about to read a logical access address, the memory management circuit 1043 converts the logical access address into a logical page of a corresponding logical unit and reads the data from the corresponding physical page according to the logical unit-physical unit mapping table.

When a write command is received from the host system 1000, the memory management circuit 1043 selects a physical unit from the spare area 504 as a substitute physical unit and writes the data to be written by the host system 1000 into the substitute physical unit. To be specific, in the present exemplary embodiment, if several write commands are received from the host system 1000 and the write data corresponding to these write commands is corresponding to different logical pages, the write data is sequentially written into a substitute physical unit. When there is no more available physical page in the substitute physical unit, the memory management circuit 1043 selects another substitute physical unit from the spare area 504 and continues to write the data to be written by the host system 1000. When the number of substitute physical units reaches an upper limit, the memory management circuit 1043 executes a data merging procedure to combine valid data belonging to the same logical unit into a new physical unit selected from the spare area 504, then marks the data in the substitute physical units as invalid data, and links the substitute physical units back to the spare area 504.

FIGS. 5A-5D are diagrams illustrating how data is written into a substitute physical unit according to an exemplary embodiment of the invention. In the present embodiment, it is assumed that each physical unit includes M physical pages (M is a positive integer) and each physical page has a data bit area and a redundant bit area, wherein the data bit area is used for storing data to be written by the host system 1000, and the redundant bit area is used for storing information related to the physical page (for example, an ECC code and a logical access address, etc).

Figure 5A:
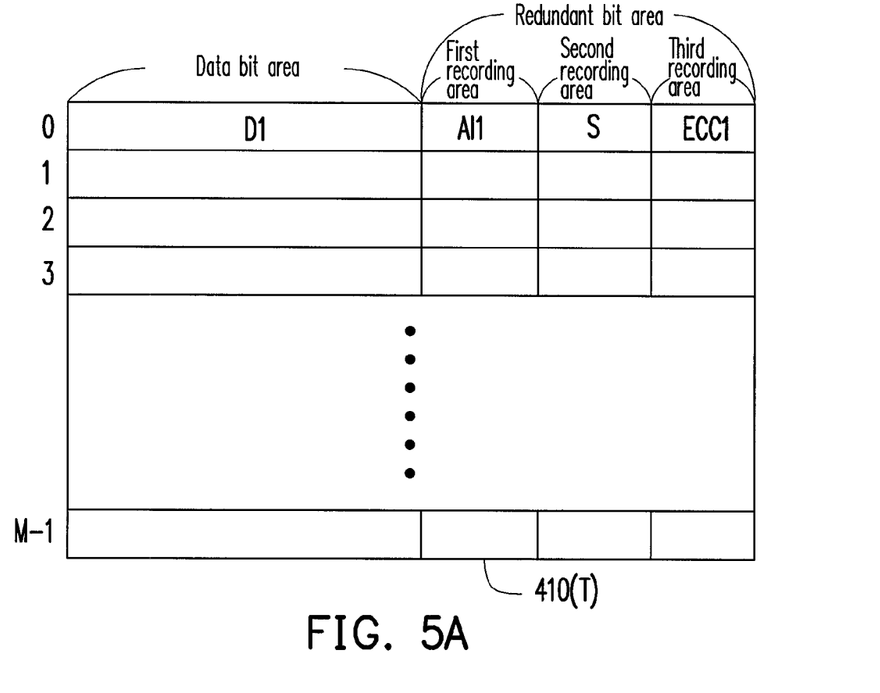
FIGS. 5A-5D are diagrams illustrating how data is written into a substitute physical unit according to an exemplary embodiment of the invention.

When the host system 1000 is about to write a write data D1 into a specific logical page (for example, a logical page 3) in the logical units 610(0)-610(L), the memory management circuit 1043 receives the write data D1 through the host system interface 1041. Herein as shown in FIG. 5A, the memory management circuit 1043 selects a physical unit 410(T) from the spare area 504 as a substitute physical unit and writes the write data D1, an address access information AI1 corresponding to the write data D1, and an ECC code ECC1 of the write data D1 into the $0^{th}$ physical page of the substitute physical unit 410(T). Besides, the memory management circuit 1043 also temporarily stores the address access information AI1 into the buffer memory 3002. In the present exemplary embodiment, the address access information AI1 is a logical page (i.e., the logical page 3) corresponding to the write data D1.

In the present exemplary embodiment, the write data D1 is written into the data bit area of the $0^{th}$ physical page, the address access information AI1 is written into a first recording area in the redundant bit area of the $0^{th}$ physical page, and the ECC code ECC1 is written into a third recording area in the redundant bit area. In addition, the memory management circuit 1043 writes a start mark (indicated with symbol "S" in FIG. 5A) into a second recording area in the redundant bit area of the $0^{th}$ physical page. In other exemplary embodiments, the memory management circuit 1043 may not write any information into the second recording area in the redundant bit area or record the address access information corresponding to a write data written into the last physical page of a previous substitute physical unit into the second recording area in the redundant bit area when there are already multiple substitute physical units.

Figure 5B:
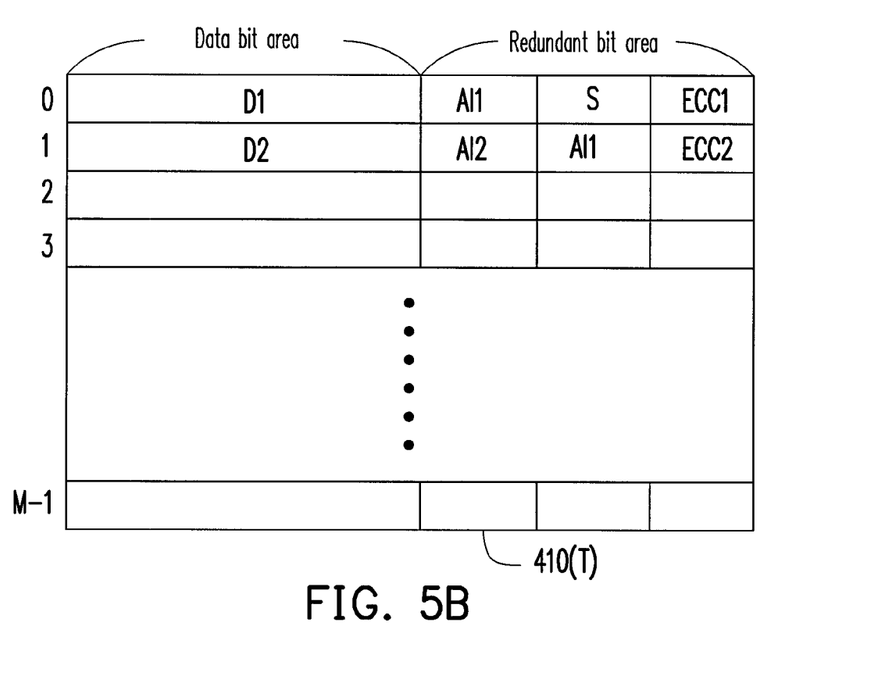

If the memory management circuit 1043 receives a write data D2 from the host system 1000 and the write data D2 is corresponding to a specific logical page (for example, a logical page 7) in the logical units 610(0)-610(L), as shown in FIG. 5B, the memory management circuit 1043 respectively writes the write data D2, an address access information AI2 corresponding to the write data D2 (for example, the logical page 7 corresponding to the write data D2), and an ECC code ECC2 of the write data D2 into a data bit area, a first recording area in the redundant bit area, and a third recording area in the redundant bit area of the $1^{st}$ physical page in the substitute physical unit 410(T). Besides, the memory management circuit 1043 obtains the address access information AI1 corresponding to the write data D1 of the previous write command from the buffer memory 3002 and writes the address access information AI1 into a second recording area in the redundant bit area of the $1^{st}$ physical page. Similarly, the memory management circuit 1043 temporarily records the address access information AI2 into the buffer memory 3002.

Figure 5C:
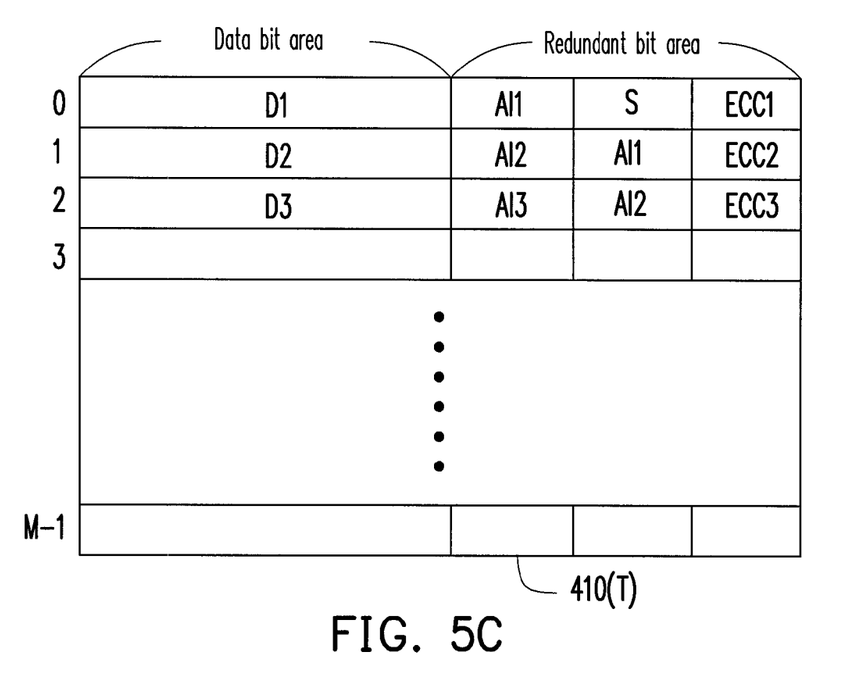

Thereafter, if the host system 1000 is about to write a write data D3 into a specific logical page (for example, a logical page 9) in the logical units 610(0)-610(L), after the memory management circuit 1043 receives the write data D3, it obtains the address access information AI2 corresponding to the write data D2 of the previous write command from the buffer memory 3002 and respectively writes the write data D3, an address access information AI3 corresponding to the write data D3 (for example, a logical page 9 corresponding to the write data D3), an ECC code ECC3 of the write data D3, and the address access information AI2 into the data bit area, a first recording area in the redundant bit area, a third recording area in the redundant bit area, and a second recording area in the redundant bit area of the $2^{nd}$ physical page in the substitute physical unit 410(T) (as shown in FIG. 5C).

Figure 5D:
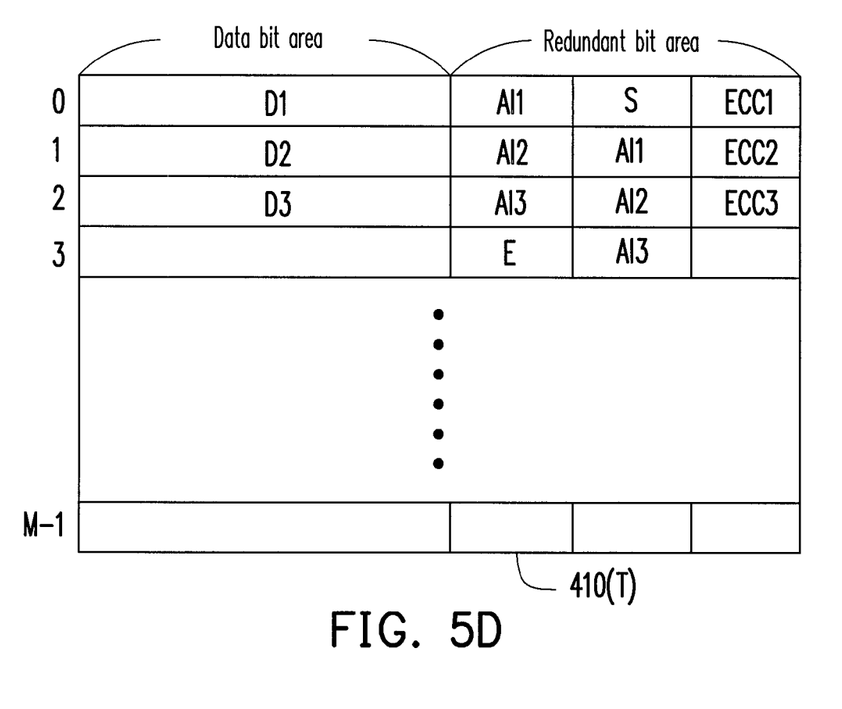

Assuming that the host system 1000 further issues a flush command after it issues the write command corresponding to the write data D3 (which means the host system 1000 is about to execute a shutdown procedure), besides clearing off data in the cache memory (not shown) of the memory storage device 100, the memory management circuit 1043 further obtains a specific physical page (in the present exemplary embodiment, the specific physical page may be the $3^{rd}$ physical page in the substitute physical unit 410(T)) containing no data from the substitute physical unit 410(T), and as shown in FIG. 5D, writes an end mark (indicated with a symbol "E" in FIG. 5D) into a first recording area in the redundant bit area of the $3^{rd}$ physical page and writes the address access information AI3 corresponding to the last write data D3 before the flush command is received into the second recording area in the redundant bit area of the $3^{rd}$ physical page. In another exemplary embodiment, the memory management circuit 1043 may write meaningless stuffing data or a table generated by the memory storage device 100 during its operation into the data bit area of the $3^{rd}$ physical page.

As shown in FIGS. 5A-5D, the data bit area of each physical page in the substitute physical unit 410(T) is used for writing data belonging to a single logical page, while the redundant bit area is used for writing two address access information corresponding to different logical pages, wherein one address access information is corresponding to a current write data, and the other address access information is corresponding to a write data previously written by the host system 1000. If the current write data is written into the $i^{th}$ physical page, then the previous write data is written into the physical $(i-1)^{th}$ page.

If the memory storage device 100 is restarted in the state illustrated in FIG. 5D, the memory management circuit 1043 reads and scans each physical page in the rewritable non-volatile memory chip 106 to identify the address access information corresponding to the data written into the physical page (i.e., which logical page the data belongs to) by using the information recorded in the redundant bit area of the physical page, so as to re-construct the reference tables required by the operation of the memory storage device 100. To be specific, when the memory management circuit 1043 scans each physical page, the ECC circuit 3006 determines the accuracy of other data recorded in the physical page by using the ECC code recorded in the redundant bit area of the physical page. If the ECC circuit 3006 detects no data error, the memory management circuit 1043 reads the address access information recorded in the first recording area of the redundant bit area and identifies the logical page corresponding to the data in the physical page.

For example, when the memory management circuit 1043 scans the $1^{st}$ physical page in the substitute physical unit 410(T), if the ECC circuit 3006 detects a data error in the physical page by using the ECC code ECC2 in the redundant bit area thereof and the number of error bits exceeds the number of bits correctable to the ECC code ECC2, the memory management circuit 1043 cannot identify the logical page corresponding to the write data D2 according to the information recorded in the redundant bit area of the physical page. Thereby, the memory management circuit 1043 reads the next physical page (i.e., the $2^{nd}$ physical page) in the substitute physical unit 410(T) and identifies that the data in the $1^{st}$ physical page is corresponding to the logical page 7 according to the address access information AI2 recorded in the second recording area in the redundant bit area of the $2^{nd}$ physical page. Subsequently, when the host system 1000 is about to read the logical page 7, the memory management circuit 1043 sends a data error message to the host system 1000, so that the operating system in the host system 1000 can fix the data error or perform any other related operation.

In the present exemplary embodiment, every time when the memory management circuit 1043 writes a write data into a physical page, it backs up the address access information corresponding to the write data of a previous write command. Accordingly, if a data error is detected when the memory storage device 100 is restarted and scans the physical pages, the memory management circuit 1043 can obtain the backup address access information from the next physical page. However, the backup technique described above is not intended to limit the scope of the invention, and in other exemplary embodiments of the invention, after writing a write data and the corresponding address access information into a physical page, the memory management circuit 1043 may also write the address access information corresponding to the write data of a $k^{th}$ (k is a positive integer greater than or equal to 1) write command before the current write command into the physical page. Accordingly, if a data error is detected in a specific physical page when the memory storage device 100 is restarted, the memory management circuit 1043 reads the $k^{th}$ physical page after the specific physical page to obtain the backup address access information.

It should be noted that even though the invention is described by assuming the address access information to be logical pages corresponding to write data in the exemplary embodiment described above, the invention is not limited thereto. In another exemplary embodiment of the invention, if the physical blocks in the rewritable non-volatile memory chip 106 are grouped into a plurality of zones and each zone is considered an independent management unit, the address access information corresponding to each write data may be one or a combination of a logical zone corresponding to the write data, a logical block corresponding to the write data, and a logical page corresponding to the write data. For example, the address access information AI1 may indicate which logical page in which logical block of which logical zone the write data D1 belongs to.

In following embodiments, the rewritable non-volatile memory chip 106 includes a plurality of memory modules (for example, memory dies), and each physical unit is composed of a plurality of physical blocks respectively belonging to different memory modules. Accordingly, the technique adopted by the memory management circuit 1043 for backing up address access information corresponding to other write data when it writes a write data is different from that described in foregoing exemplary embodiment.

Figure 6:
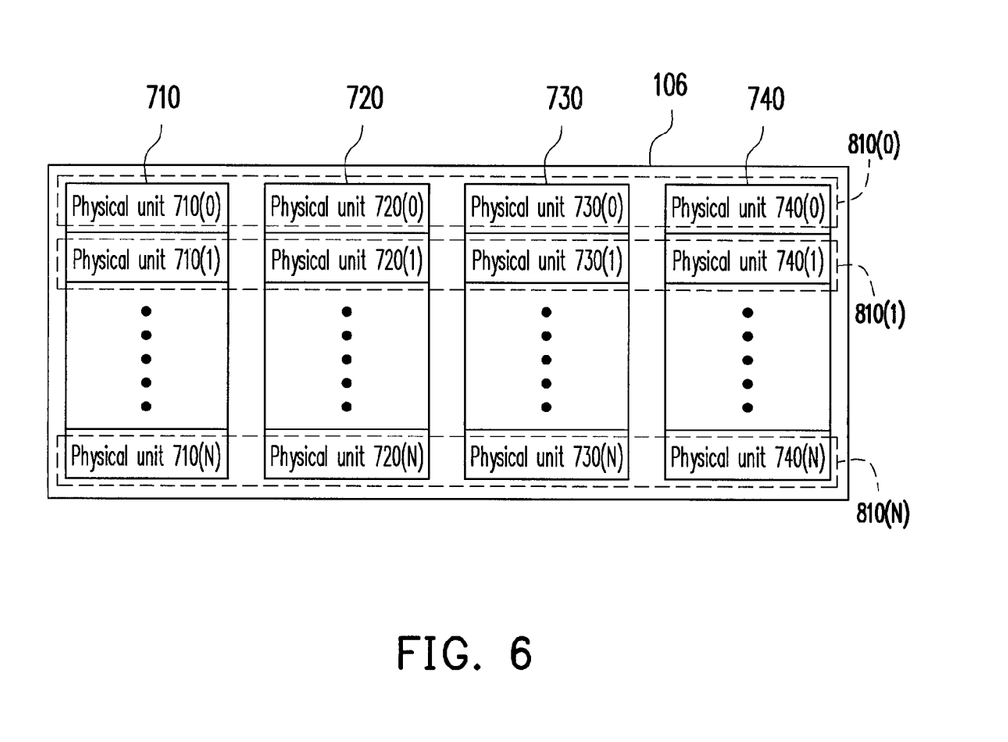
FIG. 6 is a diagram illustrating how physical units are managed according to another exemplary embodiment of the invention.

FIG. 6 is a diagram illustrating how physical units are managed according to another exemplary embodiment of the invention. In the present exemplary embodiment, the rewritable non-volatile memory chip 106 includes a memory module 710, a memory module 720, a memory module 730, and a memory module 740. The memory modules 710-740 are respectively coupled to the memory controller 104 through four individual data buses (not shown). However, in other exemplary embodiments, the memory modules 710-740 may also be coupled to the memory controller 104 through a single data bus. As shown in FIG. 6, the memory module 710 has physical blocks 710(0)-710(N), the memory module 720 has physical blocks 720(0)-720(N), the memory module 730 has physical blocks 730(0)-730(N), and the memory module 740 has physical blocks 740(0)-740(N).

To be specific, the memory management circuit 1043 logically groups the physical blocks in the memory modules 710-740 into a plurality of physical units. For example, the physical block 710(0), the physical block 720(0), the physical block 730(0), and the physical block 740(0) are grouped into a physical unit 810(0), the physical block 710(1), the physical block 720(1), the physical block 730(1), and the physical block 740(1) are grouped into a physical unit 810(1), and so on. Since the memory management circuit 1043 manages the physical blocks in the rewritable non-volatile memory chip 106 in unit of physical unit, when it executes a write command or a read command issued by the host system 1000, the memory management circuit 1043 performs data writing or reading operations on the four physical blocks in the same physical unit but different memory modules in a parallel manner.

It should be noted that even though the present exemplary embodiment is described with four memory modules, the invention is not limited thereto. In another exemplary embodiment of the invention, the rewritable non-volatile memory chip 106 may also include two or eight memory modules.

Figure 7:
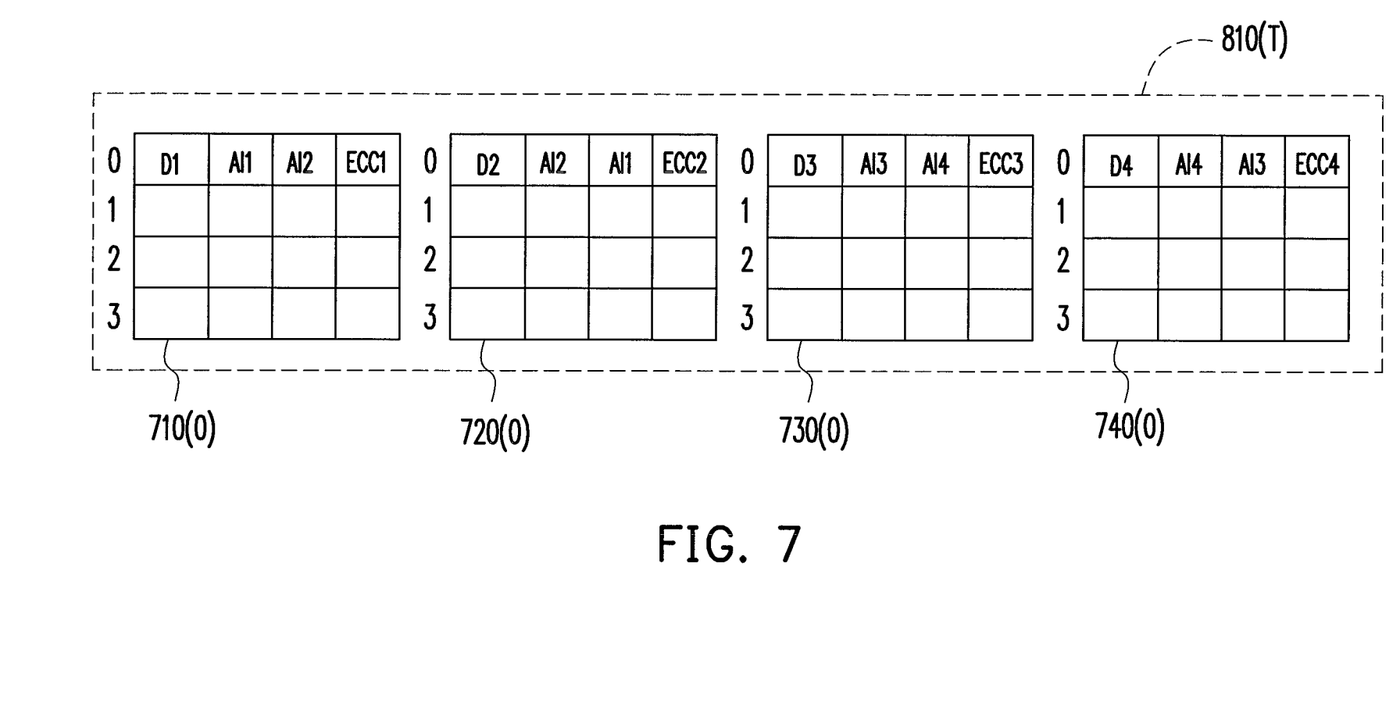
FIG. 7 is a diagram illustrating how data is written into a substitute physical unit according to another exemplary embodiment of the invention.

FIG. 7 is a diagram illustrating how the memory management circuit 1043 writes a write data into a substitute physical unit 810(T) in response to a write command received from the host system with the management framework illustrated in FIG. 6. For the convenience of description, it is assumed that each physical block includes four physical pages and the memory management circuit 1043 receives four write data D1-D4 from the host system 1000, wherein the write data D1-D4 is corresponding to four different logical pages and is respectively corresponding to address access information AI1-AI4. In the present exemplary embodiment, the address access information AI1-AI4 respectively includes the logical pages respectively corresponding to the write data D1-D4. Herein it is assumed that the write data D1 belongs to a logical page 5, the write data D2 belongs to a logical page 10, the write data D3 belongs to a logical page 8, and the write data D4 belongs to a logical page 15.

In the present exemplary embodiment, besides the address access information corresponding to the written data, each physical page in the substitute physical unit 810(T) further records the address access information corresponding to the data written into another physical page, wherein the two physical pages belong to different memory modules but have the same sequence number in the corresponding memory modules.

Referring to FIG. 7, the memory management circuit 1043 writes the write data D1-D4 all together into the selected substitute physical unit 810(T). Herein the memory management circuit 1043 writes the write data D1 into the data bit area of the $0^{th}$ physical page of the physical block 710(0) in the substitute physical unit 810(T) and writes the write data D2 into the data bit area of the $0^{th}$ physical page of the physical block 720(0) in the substitute physical unit 810(T). The memory management circuit 1043 further writes the address access information AI1 corresponding to the write data D1, the address access information AI2 corresponding to the write data D2, and the ECC code ECC1 corresponding to the write data D1 respectively into a first recording area, a second recording area, and a third recording area in the redundant bit area of the $0^{th}$ u physical page of the physical block 710(0). Besides, the memory management circuit 1043 writes the address access information AI2 corresponding to the write data D2, the address access information AI1 corresponding to the write data D1, and the ECC code ECC2 corresponding to the write data D2 respectively into a first recording area, a second recording area, and a third recording area in the redundant bit area of the $0^{th}$ physical page of the physical block 720(0). In other words, the $0^{th}$ physical page of the physical block 720(0) can be considered as a backup area of the $0^{th}$ physical page of the physical block 710(0), and the $0^{th}$ physical page of the physical block 710(0) can be considered as a backup area of the $0^{th}$ physical page of the physical block 720(0).

Similarly, the memory management circuit 1043 writes the write data D3 into the data bit area of the $0^{th}$ physical page of the physical block 730(0) in the substitute physical unit 810(T) and writes the write data D4 into the data bit area of the $0^{th}$ physical page of the physical block 740(0) in the substitute physical unit 810(T). Meanwhile, the memory management circuit 1043 also writes the address access information AI3 corresponding to the write data D3, the address access information AI4 corresponding to the write data D4, and the ECC code ECC3 corresponding to the write data D3 respectively into a first recording area, a second recording area, and a third recording area in the redundant bit area of the $0^{th}$ physical page of the physical block 730(0). Besides, the memory management circuit 1043 writes the address access information AI4 corresponding to the write data D4, the address access information AI3 corresponding to the write data D3, and the ECC code ECC4 corresponding to the write data D4 respectively into a first recording area, a second recording area, and a third recording area in the redundant bit area of the $0^{th}$ physical page of the physical block 740(0). Accordingly, the $0^{th}$ physical page of the physical block 730(0) and the 0th physical page of the physical block 740(0) are backup areas of each other.

In the present exemplary embodiment, the memory module 710 and the memory module 720 are backup areas of each other, and the memory module 730 and the memory module 740 are backup areas of each other. However, in another exemplary embodiment, a different backup technique may be adopted. For example, the memory module 710 is used as the backup area of the memory module 720, the memory module 720 is used as the backup area of the memory module 730, the memory module 730 is used as the backup area of the memory module 740, and the memory module 740 is used as the backup area of the memory module 710.

If the memory storage device 100 is restarted after the write data D1-D4 is written into the substitute physical unit 810(T), the memory management circuit 1043 scans each physical page in the rewritable non-volatile memory chip 106 to identify the logical page corresponding to the data in each physical page.

In the exemplary embodiment illustrated in FIG. 7, when the memory management circuit 1043 scans the $0^{th}$ physical page of the physical block 710(0), if the ECC circuit 3006 detects a data error in this physical page according to the ECC code ECC1 recorded in the redundant bit area thereof (which means the information recorded in the $0^{th}$ physical page of the physical block 710(0) is incorrect), the memory management circuit 1043 cannot identify the logical page corresponding to the data in this physical page according to the information recorded in the redundant bit area thereof. In this case, the memory management circuit 1043 reads the $0^{th}$ physical page of the physical block 720(0) (i.e., the backup area) and identifies that the data in the 0th physical page of the physical block 710(0) is corresponding to the logical page 5 according to the address access information AI1 in the second recording area of the redundant bit area of the $0^{th}$ physical page in the physical block 720(0). Subsequently, when the host system 1000 is about to read the logical page 5, the memory management circuit 1043 sends a data error message to the host system 1000.

Namely, when the memory storage device 100 is restarted and the memory management circuit 1043 scans each physical page, if a data error is detected in a physical page, the memory management circuit 1043 reads the information recorded in the corresponding physical page served as the backup area to identify the logical page corresponding to the data in the physical page containing the data error. Thereby, when the host system 1000 is about to read the logical page corresponding to the physical page containing the data error, a data error message can be sent to the host system 1000 so that the operation of the operating system in the host system 1000 won't be affected by the erroneous data.

It should be mentioned that in the exemplary embodiment described above, the address access information corresponding to a write data, the address access information corresponding to other write data, and the ECC code of the write data are sequentially written into a first recording area, a second recording area, and a third recording area in the redundant bit area of a physical page. However, the invention is not limited to foregoing correspondences. In other words, the two address access information and the ECC code can be written into the redundant bit area of the physical page in a different manner according to the actual situation or requirement. For example, in another exemplary embodiment of the invention, it may also be sequentially writing the ECC code of the write data, the address access information corresponding to the write data, and the address access information corresponding to other write data into the first recording area, the second recording area, and the third recording area in the redundant bit area of the physical page.

Figure 8:
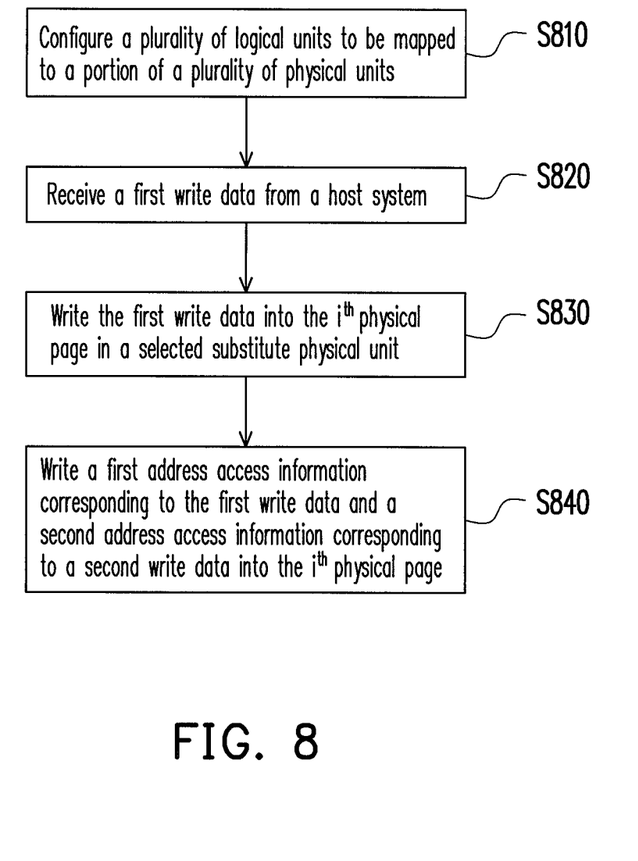
FIG. 8 is a flowchart of a data writing method according to an exemplary embodiment of the invention.

FIG. 8 is a flowchart of a data writing method according to an exemplary embodiment of the invention.

First, in step S810, the memory management circuit 1043 configures a plurality of logical units to be mapped to a portion of the physical units in the rewritable non-volatile memory chip 106, wherein each of the logical units includes a plurality of logical pages.

Then, in step S820, the memory management circuit 1043 receives a first write data from the host system 1000 through the host system interface 1041. The first write data is corresponding to a single logical page.

In step S830, the memory management circuit 1043 writes the first write data into the $i^{th}$ physical page of a selected substitute physical unit, wherein i is a positive integer.

In step S840, the memory management circuit 1043 writes the first write data, a first address access information corresponding to the first write data, and a second address access information corresponding to a second write data into the $i^{th}$ physical page. The first write data and the second write data respectively belong to different logical pages. Thereby, each physical page in the substitute physical unit records a write data corresponding to a single logical page and two address access information corresponding to different logical pages.

In summary, the invention provides a memory storage device, a memory controller, and a data writing method, wherein when a write data from a host system is written into a physical page in a selected substitute physical unit, the write data and a corresponding address access information is written into the physical page, and additionally, an address access information corresponding to a write data written into another physical page is also written into this physical page, so as to back up the address access information corresponding to the write data in the other physical page. Thus, if a data error is detected in a physical page when the memory storage device is restarted and the physical pages are scanned, the logical page corresponding to the data in the physical page with the data error can be identified by using the backup address access information in another physical page. Thereby, the host system can be correctly responded when it is about to read an erroneous data.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method, adapted to a memory storage device having a rewritable non-volatile memory chip, wherein the rewritable non-volatile memory chip comprises a plurality of physical units, and each of the physical units comprises a plurality of physical pages, the data writing method comprising:

configuring a plurality of logical units to be mapped to a portion of the physical units, wherein each of the logical units comprises a plurality of logical pages;

receiving a first write data from a host system;

writing the first write data into the $i^{th}$ physical page in a substitute physical unit selected from the physical units, wherein i is a positive integer;

writing a first address access information corresponding to the first write data and a second address access information into the $i^{th}$ physical page, wherein the second address access information is a second logical page corresponding to a second write data, the second write data written into the $j^{th}$ physical page in the substitute physical unit, and j is a positive integer and j is not equal to i; and scanning each of the physical pages to re-construct a reference table recording a mapping between the logical pages and the physical pages after the memory storage device is restated, wherein the second address access information is written into at least two different physical pages.

2. The data writing method according to claim 1, wherein the first address access information comprises at least one of a logical zone corresponding to the first write data, a logical block corresponding to the first write data, and a logical page corresponding to the first write data, and the second address access information comprises at least one of a logical zone corresponding to the second write data, a logical block corresponding to the second write data, and a logical page corresponding to the second write data.

3. The data writing method according to claim 1, wherein j is equal to (i−k) and k is a positive integer greater than or equal to 1.

4. The data writing method according to claim 3 further comprising:
when a data error is detected in the $(i-k)^{th}$ physical page, reading the $i^{th}$ physical page to identify that the second write data written into the $(i-k)^{th}$ physical page is corresponding to the second logical page; and
when the host system is about to read the second logical page, sending a data error message to the host system.

5. The data writing method according to claim 1, wherein the $i^{th}$ physical page and the $i^{th}$ physical page belong to different ones of the memory modules, and the $i^{th}$ physical page and the $j^{th}$ physical page have a same sequence number in the corresponding memory modules, wherein j is a positive integer.

6. The data writing method according to claim 5 further comprising:
when a data error is detected in the $i^{th}$ physical page, reading the $i^{th}$ physical page to identify that the second write data written into the $i^{th}$ physical page is corresponding to the second logical page; and
when the host system is about to read the second logical page, sending a data error message to the host system.

7. The data writing method according to claim 1 further comprising:
receiving a flush command from the host system;
obtaining a specific physical page containing no data from the substitute physical unit;
writing an end mark into the specific physical page; and
writing an address access information corresponding to a last write data before the flush command is received into the specific physical page.

8. The data writing method according to claim 1, wherein each of the physical pages has a data bit area and a redundant bit area, the first write data is written into the data bit area of the $i^{th}$ physical page, and the first address access information and the second address access information is written into the redundant bit area of the $i^{th}$ physical page.

9. The data writing method according to claim 1, wherein the second address access information is written to the $i^{th}$ physical page and the $j^{th}$ physical page.

10. A memory controller, for managing a rewritable non-volatile memory chip in a memory storage device, the memory controller comprising:
a host system interface, configured to couple a host system;
a memory interface, configured to couple the rewritable non-volatile memory chip, wherein the rewritable non-volatile memory chip comprises a plurality of physical units, and each of the physical units comprises a plurality of physical pages; and
a memory management circuit, coupled to the host system interface and the memory interface, for configuring a plurality of logical units to be mapped to a portion of the physical units, wherein each of the logical units comprises a plurality of logical pages,
wherein the memory management circuit further receives a first write data from the host system through the host system interface, writes the first write data into the $i^{th}$ physical page in a substitute physical unit selected from the physical units, and writes a first address access information corresponding to the first write data and a second address access information into the $i^{th}$ physical page, wherein i is a positive integer,
wherein the second address access information is a second logical page corresponding to a second write data, the second write data is written into the $j^{th}$ physical page in the substitute physical unit, and j is a positive integer and j is not equal to i,
wherein the memory management circuit further scans each of the physical pages to re-construct a reference table recording a mapping between the logical pages and the physical pages after the memory storage device is restated,
wherein the second address access information is written into at least two different physical pages.

11. The memory controller according to claim 10, wherein the first address access information comprises at least one of a logical zone corresponding to the first write data, a logical block corresponding to the first write data, and a logical page corresponding to the first write data, and the second address access information comprises at least one of a logical zone corresponding to the second write data, a logical block corresponding to the second write data, and a logical page corresponding to the second write data.

12. The memory controller according to claim 10, wherein j is equal to (i−k) and k is a positive integer greater than or equal to 1.

13. The memory controller according to claim 12, wherein when a data error is detected in the $(i-k)^{th}$ physical page, the memory management circuit reads the $i^{th}$ physical page to identify that the second write data written into the $(i-k)^{th}$ physical page is corresponding to the second logical page,
and when the host system is about to read the second logical page, the memory management circuit sends a data error message to the host system.

14. The memory controller according to claim 10, wherein the $i^{th}$ physical page and the $j^{th}$ physical page belong to different ones of the memory modules, and the $i^{th}$ physical page and the $j^{th}$ physical page have a same sequence number in the corresponding memory modules, wherein j is a positive integer.

15. The memory controller according to claim 14, wherein when a data error is detected in the $i^{th}$ physical page, the memory management circuit reads the $i^{th}$ physical page to identify that the second write data written into the $j^{th}$ physical page is corresponding to the second logical page,
and when the host system is about to read the second logical page, the memory management circuit sends a data error message to the host system.

16. The memory controller according to claim 10, wherein the memory management circuit receives a flush command from the host system through the host system interface, obtains a specific physical page containing no data from the substitute physical unit, writes an end mark into the specific physical page, and writes an address access information corresponding to a last write data before the flush command is received into the specific physical page.

17. The memory controller according to claim 10, wherein each of the physical pages has a data bit area and a redundant bit area, the first write data is written into the data bit area of the $i^{th}$ physical page, and the first address access information and the second address access information is written into the redundant bit area of the $i^{th}$ physical page.

18. The memory controller according to claim 10, wherein the second address access information is written to the $i^{th}$ physical page and the $j^{th}$ physical page.

19. A memory storage device, comprising:
a rewritable non-volatile memory chip, comprising a plurality of physical units, wherein each of the physical units comprises a plurality of physical pages;
a connector, configured to couple a host system; and a memory controller, coupled to the rewritable non-volatile memory chip and the connector, for configuring a plurality of logical units to be mapped to a portion of the physical units, wherein each of the logical units comprises a plurality of logical pages, the memory controller further receives a first write data from the host system through the connector, writes the first write data into the $i^{th}$ physical page in a substitute physical unit selected from the physical units, writes a first address access information corresponding to the first write data and a second address access information into the $i^{th}$ physical page, wherein i is a positive integer, wherein the second address access information is a second logical page corresponding to a second write data, the second write data is written into the $j^{th}$ physical page in the substitute physical unit, and j is a positive integer and j is not equal to i, and scans each of the physical pages to re-construct a reference table recording a mapping between the logical pages and the physical pages after the memory storage device is restated, wherein the second address access information is written into at least two different physical pages.

20. The memory storage device according to claim 19, wherein the first address access information comprises at least one of a logical zone corresponding to the first write data, a logical block corresponding to the first write data, and a logical page corresponding to the first write data, and the second address access information comprises at least one of a logical zone corresponding to the second write data, a logical block corresponding to the second write data, and a logical page corresponding to the second write data.

21. The memory storage device according to claim 19, wherein j is equal to (i–k) and k is a positive integer greater than or equal to 1.

22. The memory storage device according to claim 21, wherein, when a data error is detected in the $(i-k)^{th}$ physical page, the memory controller reads the $i^{th}$ physical page to identify that the second write data written into the $(i-k)^{th}$ physical page is corresponding to the second logical page, and when the host system is about to read the second logical page, the memory controller sends a data error message to the host system.

23. The memory storage device according to claim 19, wherein the $i^{th}$ physical page and the $j^{th}$ physical page belong to different ones of the memory modules, and the $i^{th}$ physical page and the $j^{th}$ physical page have a same sequence number in the corresponding memory modules, wherein j is a positive integer.

24. The memory storage device according to claim 23, wherein when a data error is detected in the $j^{th}$ physical page, the memory controller reads the $i^{th}$ physical page to identify that the second write data written into the $j^{th}$ physical page is corresponding to the second logical page, and when the host system is about to read the second logical page, the memory controller sends a data error message to the host system.

25. The memory storage device according to claim 19, wherein the memory controller receives a flush command from the host system through the connector, obtains a specific physical page containing no data from the substitute physical unit, writes an end mark into the specific physical page, and writes an address access information corresponding to a last write data before the flush command is received into the specific physical page.

26. The memory storage device according to claim 19, wherein each of the physical pages has a data bit area and a redundant bit area, the first write data is written into the data bit area of the ith physical page, and the first address access information and the second address access information is written into the redundant bit area of the ith physical page.

27. The memory storage device according to claim 19, wherein the second address access information is written to the $i^{th}$ physical page and the $j^{th}$ physical page.

* * * * *